(12) United States Patent
Tabor

(10) Patent No.: US 7,856,161 B2
(45) Date of Patent: Dec. 21, 2010

(54) OPTICAL FIBER FACEPLATES INCLUDING CONVERGENT CONSTITUENT IMAGING CONDUITS AND TILED IMAGING ARRAYS INCORPORATING THE SAME

(75) Inventor: Kevin Tabor, Webster, MA (US)

(73) Assignee: Schott Corporation, Elmsford, NY (US)

( * ) Notice: Subject to any disclaimer, the term of this patent is extended or adjusted under 35 U.S.C. 154(b) by 308 days.

(21) Appl. No.: 12/074,871

(22) Filed: Mar. 6, 2008

(65) Prior Publication Data

US 2008/0232751 A1      Sep. 25, 2008

Related U.S. Application Data

(60) Provisional application No. 60/919,168, filed on Mar. 21, 2007.

(51) Int. Cl.
    *G02B 6/04*     (2006.01)
(52) U.S. Cl. .................... 385/120; 385/115; 385/123
(58) Field of Classification Search ............. 385/115, 385/120, 123
    See application file for complete search history.

(56) References Cited

U.S. PATENT DOCUMENTS 4,533,210 A    8/1985   Jeskey
4,573,082 A    2/1986   Jeskey
5,479,550 A  * 12/1995  Nishioka et al. ............ 385/116

\* cited by examiner

*Primary Examiner*—Jennifer Doan
(74) *Attorney, Agent, or Firm*—Louis J. Franco; Law Office of Louis J. Franco

(57)                ABSTRACT

An imaging module includes an optical fiber faceplate with an image-input face, a planar image-output face, and a plurality of adjacently fused, internally reflecting imaging conduits extending between the image-input and image-output faces. The constituent imaging conduits extend along conduit axes that mutually converge in a direction that such that an image inputted through the image-input face is reduced in size along at least one dimension for outputting through the image-output face. The imaging module further includes an imaging detector array including a plurality of photosensitive detector elements arranged in accordance with a predetermined array format. The faceplate is situated in front of the detector array such that light incident upon the image-input face is transmitted through the faceplate and optically communicated to the detector elements through the image-output face. Multiple imaging modules can be tiled in tight formations in order to form a larger format imaging array.

18 Claims, 6 Drawing Sheets

FIG. 3

A method of fabricating an optical fiber faceplate having convergent imaging conduits, the method comprising: 300

↓ providing an optical fiber faceplate including opposed and mutually parallel first and second faces and a plurality of adjacently bonded light-conductive imaging conduits, wherein (i) each imaging conduit includes an optically transmissive core having an imaging-core refractive index and being surrounded by a cladding material having an imaging-cladding refractive index lower than the imaging-core refractive index such that light propagates through the imaging conduit by total internal reflection and (ii) the optical cores extend along mutually parallel core axes that extend though the first and second faces; 310

↓ positioning at least one of the first and second faces of the faceplate in contact with a form surface having a predetermined curvature; 315

↓ heating the faceplate to a temperature sufficient to cause the faceplate to soften and cause the at least one of the first and second faces that is in contact with a curved form surface to conform to the curved surface with which it is in contact such that (i) the axes of optical cores within the faceplate move from a mutually parallel alignment to a convergent alignment and (ii) the first and second faces of the faceplate assume curvatures that are mutually concentric about one of (a) a point and (b) an axis; 320

↓ cooling the faceplate sufficiently to cause the faceplate to become rigid; and 325

↓ cutting the curved faceplate along two parallel planes in order to form an optical fiber faceplate including a planar image input face, a planar image output face opposite the input face, and a plurality of convergent imaging conduits extending between the planar input and output faces. 330

ADDITIONAL CUT PLANES TO DEFINE BEVELED PERIPHERY EXTENDING BET. $P_1$ AND $P_2$

OPTICAL FIBER FACEPLATES INCLUDING CONVERGENT CONSTITUENT IMAGING CONDUITS AND TILED IMAGING ARRAYS INCORPORATING THE SAME

PROVISIONAL PRIORITY CLAIM

Priority based on Provisional Application Ser. No. 60/919,168 filed Mar. 21, 2007, and entitled "OPTICAL FIBER FACEPLATES INCLUDING CONVERGENT CONSTITUENT IMAGING CONDUITS AND TILED IMAGING ARRAYS INCORPORATING THE SAME" is claimed. The entirety of the disclosure of the previous provisional application, including the drawings, is incorporated herein by reference as if set forth fully in the present application.

BACKGROUND

The transmission of light and images through bundles comprised of flexible or adjacently fused optical fibers is an established art. Image conduits such as inverters, tapers and "straight-throughs" are well known to practitioners of the optical fiber arts. Fused optical fiber image conduits find broad application as components in such devices as night visions goggles, rifle scopes, x-ray detectors and medical imaging apparatus, by way of non-limiting example.

Various existing imaging devices incorporate optical fiber components coupled with image detector arrays such as charge-coupled devices (CCDs) and complimentary metal-oxide semiconductor (CMOS) circuits. Fundamental to each of these devices is the optical coupling of the optical fiber component with the image detector array such that an image introduced into a first end of the optical fiber component is transmitted through the optical fiber component for registration by the image detector array. Among the fused optical fiber components currently coupled with image detector arrays are tapered bundles (tapers) that either reduce or enlarge an input image, depending on whether the small or large end is regarded as the input end; elongated "straight-through" bundles that neither reduce nor enlarge an image; and optical fiber faceplates that neither reduce nor enlarge an inputted image.

Two or more traditional optical fiber faceplates (hereinafter "faceplate"), each of which is coupled to a corresponding detector array, can be mutually abutted in order to form a larger-format tiled imaging array. However, because the dimensions or "footprint" of each faceplate must match the footprint of its corresponding detector array in order to avoid gaps in the input image, the ability to tile multiple traditional faceplates is limited due to the need to route electrical conduits (e.g. bond wires) to and from the image detector array corresponding to each faceplate. For instance, while a 2×N array of tiled faceplate/detector-array pairs is feasible by orienting the detector arrays such that their electrical conduits lead out to the perimeter of the tiled array, arrays 3×3 and larger are unwieldy because of the difficulties associated with routing electrical conduits to the interior (non-peripheral) detector array(s).

In order to overcome the difficulties associated with tiling faceplates and their associated detector arrays in order to form large format imaging arrays, traditional reducing tapers of square or rectangular cross-section can be used in place of traditional faceplates. However, as is known in the art, the cross-sectional area of a traditional taper changes quite gradually as a function of length. Accordingly, the reduction in cross-sectional area necessary to have the larger image-input ends mutually abutted while the smaller image-output ends are sufficiently spaced apart to accommodate electrical conduits indicates tapers substantially thicker than a faceplate between the image-input and image-output ends. The use of relatively thick tapers in place of faceplates, while alleviating electrical-conduit routing difficulties, introduces a different set of difficulties including increased cost and weight and degradation in image quality associated with longer light-transmission lengths and defects attendant to the taper fabrication process.

Accordingly, there exists a need for an imaging module including an optical component with the image-reducing characteristics of a traditional reducer and the relatively thin profile of a traditional optical fiber faceplate.

SUMMARY

In an illustrative embodiment, a tiled imaging array includes a platform to which is mounted an N×M array of imaging modules that are mutually abutted in order to form a "large format" imaging array with an image-input surface that is as contiguous and seamless as practicable. Each imaging module constitutes a "tile" in the overall array and includes an image detector array such as, by way of non-limiting example, a microbolometer, a charge-coupled device (CCD) or a complimentary metal-oxide semiconductor (CMOS) circuit. As is known by those acquainted with the relevant art(s), a typical image detector is an integrated circuit including a large number of discrete detector elements that are (i) arranged in accordance with a predetermined array format and (ii) highly responsive to electromagnetic energy within a pre-selected wavelength range. The electrical outputs of the detector elements, each of which represents a pixel within a detected image, are communicatively linked to sophisticated signal processing circuitry that samples, digitizes and stores them in computer memory. Data indicative of a stored image can be subsequently transferred to another device such as a printer or video display.

Situated in front of each image detector is an optical fiber faceplate including internally-reflecting imaging conduits for transmitting light from a scene to be imaged onto the detector elements of the detector array. Each optical fiber faceplate of a typical embodiment includes a planar image-input face and a planar image-output face opposite, and parallel to, the image-input face. Extending between the image-input and image-output faces is a plurality of adjacently fused, internally-reflecting imaging conduits for transmitting light inputted at the image-input face to and through the image-output face. The imaging conduits are oriented within the faceplate such that they extend along conduit axes that pass through the image-input and image-output faces and mutually converge in the direction from the image-input face to the image-output face toward one of (i) a central point and (ii) a central axis that is spatially situated behind the detector array with which the faceplate is associated. It will be appreciated that the mutual convergence of the conduit axes as described means that an image inputted through the image-input face is reduced in size along at least one dimension (e.g., the horizontal or vertical dimension) as it is transmitted through the faceplate. By way of more specific, non-limiting example, an image-reducing optical fiber faceplate configured such that the conduit axes converge toward a central point reduces an inputted image along both the horizontal and vertical dimensions of that image. Distinguishably, an image-reducing optical fiber faceplate configured such that the conduit axes converge toward a central axis reduces an inputted image along only one of the horizontal and vertical dimensions of that image. As will be more fully appreciated through examination of the detailed description and associated drawings, the incorporation into a tiled array of optical fiber faceplates including convergent imaging conduits facilitates, among other features, tight adjacent abutment of neighboring faceplates and routing of electrical conduits (e.g., bond wires) between the imaging detector arrays in an N×M array of imaging modules.

An illustrative method of fabricating an optical fiber faceplate incorporating convergent constituent light-conductive imaging conduits employs techniques inclusive of those applied to the fabrication of conventional optical fiber faceplates. A conventional optical fiber faceplate, as is known in the relevant art(s), comprises a plurality of mutually and adjacently bonded (e.g., fused) optical fiber image conduits, each of which conduits includes an optical core having a first refractive index surrounded by cladding material having a second refractive index lower than the first refractive index. Moreover, in a conventional optical fiber faceplate, the optical cores extend along mutually parallel axes. Consistent with the formation of conventional faceplates, various implementations of the present invention include providing or forming an image-transporting fiber bundle including a plurality of adjacently arranged light-conductive imaging conduits extending generally along a longitudinal axis between first and second bundle ends. Each imaging conduit includes an optically transmissive core having an imaging-core refractive index surrounded by a cladding material having an imaging-cladding refractive index lower than the imaging-core refractive index such that light propagates through the imaging conduit by total internal reflection and such that the plural imaging conduits combine to form an image-conducting bundle. In various aspects, each of the core and the cladding comprises glass. The formation of such structures is generally known among fabricators of fused optical fiber components and is therefore not further described in this summary.

The fused fiber bundle is cut perpendicularly to its longitudinal axis in order to form at least one fused optical fiber faceplate including first and second planar faces between which the light-conductive imaging conduits extend with their optically transmissive cores in mutually parallel alignment. In various implementations, the first and second faces of a faceplate are ground and polished in order to create smooth faces and, if desired, a faceplate of uniform thickness or alternative profile.

Pursuant to the formation of a faceplate having convergent imaging conduits, the traditionally fabricated faceplate is positioned with at least one of the first and second planar faces thereof in contact with a form surface having a predetermined curvature. Typically, the faceplate is situated between a first, concave die portion and a second, convex die portion. According to one implementation, each of the first and second die portions includes a surface that is a spheroidal section. In alternative implementations, each die portion defines a cylindrical section.

Once the faceplate is properly situated relative to the at least one form surface, the faceplate is heated to a temperature sufficient to cause the faceplate to soften and cause the at least one of the first and second faces that is in contact with a curved form surface to conform to the curved surface with which it is in contact such that (i) the axes of optical cores within the faceplate move from a mutually parallel alignment to a convergent alignment and (ii) the first and second faces of the faceplate assume curvatures that are mutually concentric about one of (a) a point and (b) an axis. In a typical shaping process, the first and second die portions are urged toward one another with the faceplate therebetween such that one of the first and second faces thereof conforms to the concave die portion and the other of the first and second faces conforms to the convex die portion. If the die portions define spherical (i.e., a special case of spheroidal) sections, the imaging conduits are oriented such that they extend along axes that are disposed radially relative to a central point at the center of an imaginary sphere. Alternatively, if the first and second die portions define cylindrical sections, the imaging conduits in the molded faceplate are oriented such that they extend along axes that are disposed radially with respect to a central axis at the center of an imaginary cylinder.

Once the faceplate is curved within the mold, the faceplate is cooled (or simply permitted to cool) sufficiently to cause it to become rigid. The first side of the faceplate is one of (i) concave and (ii) convex and the second side is the other of (i) concave and (ii) convex. The curved faceplate is cut along two planes in order to form an optical fiber faceplate including a planar image-input face, a planar image-output face opposite the image-input face, and a plurality of convergent imaging conduits extending between the planar image-input and image-output faces. In a typical version, the planes along which the cuts are made to form the opposed image-input and image-output faces are parallel, but faceplates having image-input and image-output faces otherwise oriented with respective to one another are within the scope and contemplation of the invention. The orientation of the imaging conduits relative to the planar image-input and image-output faces is such that light-input ends and light-output ends of the imaging conduits coincide with, respectively, the planar image-input face and the planar image-output face of the optical fiber faceplate.

In a typical implementation, a faceplate formed with imaging conduits disposed radially relative to the central point of an imaginary sphere are suitable for use in a tiled imaging array incorporating N×M such faceplates where both N and M are greater than 1. That is, "spherically formed" faceplates are well-suited for use in two-dimensional arrays. Examples of devices incorporating two-dimensional arrays include digital cameras and x-ray screens. Alternatively, a "cylindrically formed" faceplate having imaging conduits that converge toward a central axis at the center of an imaginary cylinder may be more suited for use in one-dimensional (linear) imaging devices incorporating an imaging array with N×M faceplates, wherein one of N and M=1. Examples of such one-dimensional devices include scanners and fax machines, as well as some digital cameras. In various devices in which two or more cylindrically formed faceplates are incorporated into a one-dimensional imaging array, the faceplates are aligned and mutually abutted such that the imaging conduits of the multiple faceplates converged toward a common axis at the center of an imaginary cylinder. In other words, the central axes of the plural imaginary cylinders associated with the plural faceplates are aligned so as to extend along a single common axis.

Representative, non-limiting embodiments and implementations are more completely described and depicted in the following detailed description and the accompanying drawings.

BRIEF DESCRIPTION OF THE DRAWINGS

FIG. 3 depicts a flow of steps in an illustrative method of fabricating an optical fiber faceplate having convergent imaging conduits;

DETAILED DESCRIPTION

The following description of (i) optical fiber faceplates incorporating convergent imaging conduits, (ii) tiled imaging arrays including imaging modules with optical fiber faceplates incorporating convergent imaging conduits, and (iii) methods of fabricating optical fiber faceplates incorporating convergent imaging conduits is demonstrative in nature and is not intended to limit the invention or its application of uses. The various implementations, aspects, versions and embodiments described in the summary and detailed description are in the nature of non-limiting examples falling within the scope of the appended claims and do not serve to define the maximum scope of the claims.

Figure 1:
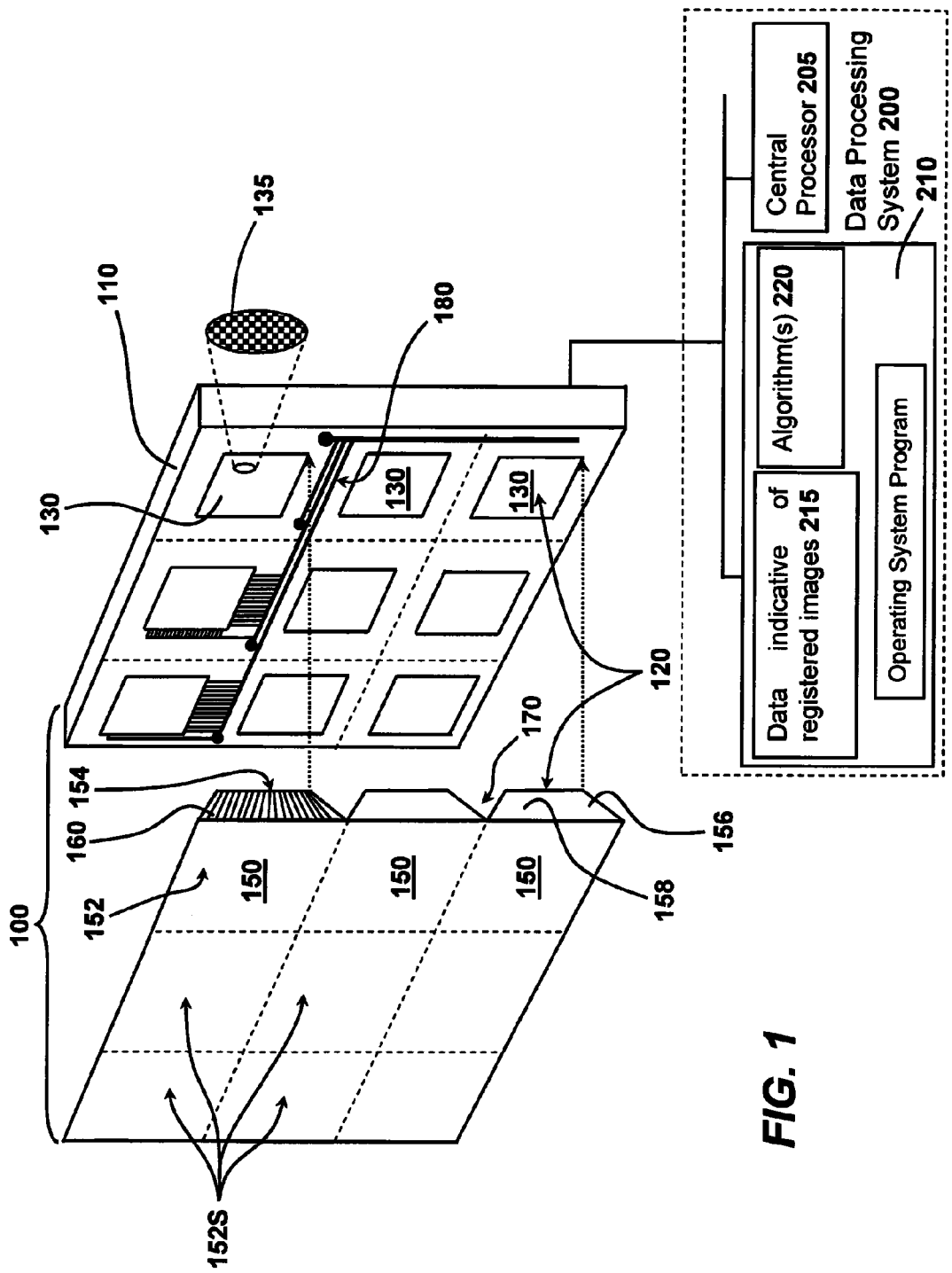
FIG. 1 shows an illustrative tiled imaging array comprising a plurality of arrayed imaging modules, each of which imaging modules includes an optical fiber faceplate incorporating imaging conduits that converge toward an image detector array.

Referring to FIG. 1, the architecture of an illustrative tiled imaging array 100 includes a platform 110 to which is mounted a 3×3 array of imaging modules 120. As indicated in both the perspective and side views of FIGS. 1 and 2, each imaging module 120 includes an image detector array 130 and an image-reducing optical fiber faceplate 150. For the purpose of rendering visible the image detector arrays 130, the 3×3 array of optical fiber faceplates 150 shown in FIG. 1 is pulled away from the 3×3 array of image detector arrays 130 with dashed arrows indicating that, in an operative mode, each optical fiber faceplate 150 is situated immediately in front the image detector array 130 to which it corresponds. Alternative implementations incorporate any of a variety of conventional detector arrays 130 configured to detect wavelengths over a predetermined range of electromagnetic wavelengths. A typical detector array 130 suitable for implementing embodiments of the invention includes photosensitive detectors elements 135 that are, to the extent practicable, uniformly sized and regularly spaced. As mentioned in the summary, three illustrative types of detector arrays 130 that may be incorporated into various alternative embodiments are (i) microbolometers (ii) charge-coupled devices (CCD) and (iii) complimentary metal-oxide semiconductor (CMOS) circuits. The detector arrays 130 are communicatively linked to a data processing system 200 including a central processor 205, memory 210 for storing data indicative of registered images 215, and a signal processing algorithm 220 for processing the electrical outputs of the detector arrays 130 and the data indicative of registered images 215.

Figure 2:
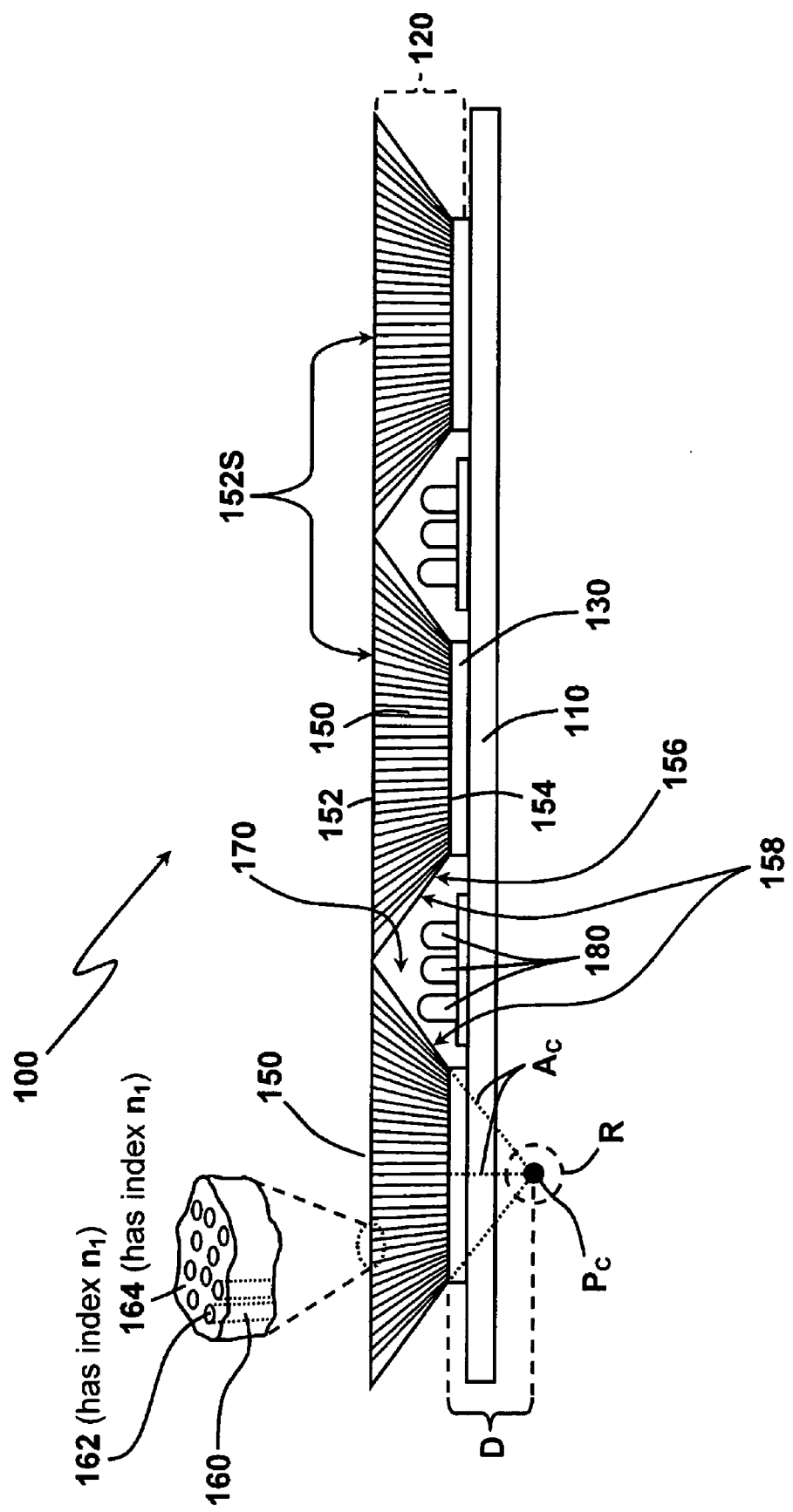
FIG. 2 depicts a side or edge view of a tiled imaging array such as the imaging array of FIG. 1.

In the illustrative version of FIGS. 1 and 2, the faceplate 150 of each imaging module 120 includes a planar image-input face 152 and a planar image-output face 154 opposite, and parallel to, the image-input face 152. The faceplate 150 of each imaging module 120 is situated in front of the detector array 130 such that light incident upon the image-input face 152 is transmitted through the faceplate 150 and optically communicated to the detector elements 135 of the detector array 130 through the image-output face 154. Extending between the image-input and image-output faces 152 and 154 is a plurality of adjacently fused, internally-reflecting imaging conduits 160 for transmitting light inputted at the image-input face 152 to and through the image-output face 154. As shown in the enlarged section of FIG. 2, each imaging conduit 160 includes an optically transmissive core 162 having an imaging-core refractive index $n_1$ surrounded by a cladding material 164 having an imaging-cladding refractive index $n_2$ lower than the imaging-core refractive index $n_1$ such that light propagates through the imaging conduit 160 by total internal reflection. In a typical embodiment in which the imaging conduits 160 are adjacently fused, the cores 162 are supported within a fused matrix of cladding material 164.

Referring still to illustrative version of FIG. 2, the imaging conduits 160 within a faceplate 150 are oriented such that they extend along conduit axes $A_C$ that converge upon a region R in space situated behind the image detector array 130 with which the faceplate 150 optically communicates. In the illustrative embodiment of FIG. 2, the imaging conduits 160 are oriented such that the conduit axes $A_C$ converge toward a central point $P_C$ a distance D behind the image-output face 154 of the faceplate 150. In alternative embodiments, the conduit axes $A_C$ converge toward a central axis $A_{CEN}$. An example of a faceplate in which the conduit axes $A_C$ converge toward a central axis $A_{CEN}$ is described later in association with FIG. 4C. While the illustrative tiled imaging array 100 of FIG. 2 shows the conduit axes $A_C$ of a faceplate 150 converging to a point $P_C$, those skilled in the relevant art will readily understand, with the benefit of the current disclosure in its entirety, that a tiled imaging array 100 can additionally or alternatively include a faceplate 150 in which the conduit axes $A_C$ are otherwise convergent (e.g., toward a central axis $A_{CEN}$) and, therefore, FIGS. 1 and 2 are relied upon to support the disclosure of embodiments including faceplates 150 with alternatively convergent imaging conduits 160.

Referring to FIGS. 1 and 2, some advantages of variously incorporating into a tiled imaging array 100 faceplates 150 including convergent imaging conduits 160 are now described. Each faceplate 150 includes a periphery 156 that extends between the image-input and image-output faces 152 and 154 and is defined by beveled edges 158. More specifically, the beveled edges 158 are oriented such that they taper toward the image-output face 154 at angles corresponding to the angles at which the peripheral imaging conduits 160 are pitched. The image-input faces 152 of multiple faceplates 150 with "rearwardly tapered" peripheries 156 are mutually abutted and retained in tight formation in order to define a larger format image-input surface 152S of the tiled imaging array 100. The tapered peripheries 156 facilitate minimized delineations between faceplates 150 at the image-input surface 152S, thereby effectuating the illusion of structural continuity and, more importantly, input-image continuity. In addition to facilitating tight abutment of adjacent image-input faces 152, the beveled edges 158 of faceplates 150 mutually abutted in the manner shown in FIGS. 1 and 2 combine to define voids 170 (or V-shaped channels) rearward of the image-input surface 152S. The voids 170 facilitate the routing of electrical conduits 180 (e.g., bond wires) behind the image-input surface 152S of the tiled imaging array 100 and, to some degree, temperature stability by allowing heat to escape from between the faceplates 150.

Figure 4A:
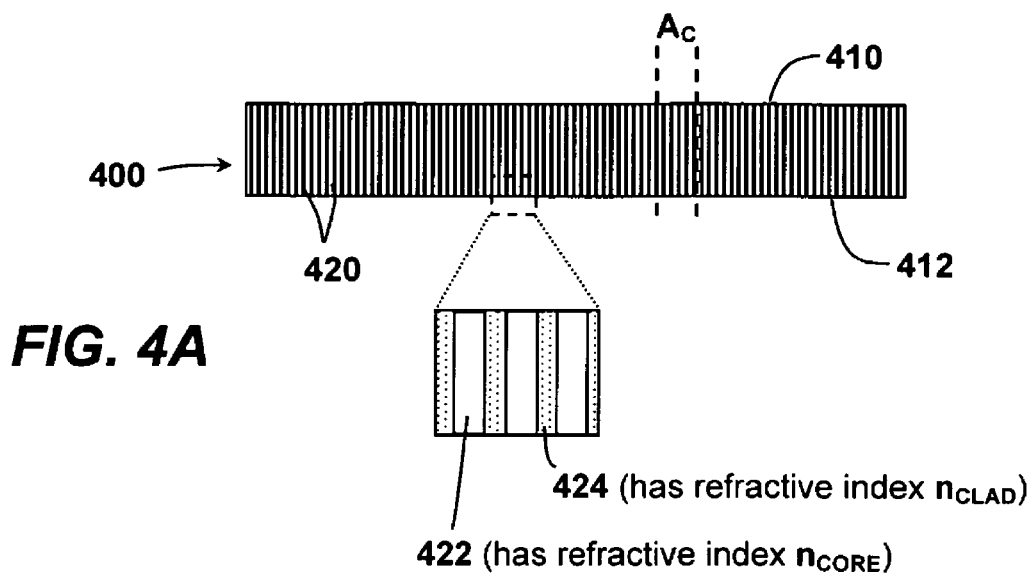
FIG. 4A shows a conventional optical fiber faceplate including a plurality of optically transmissive cores supported in mutually parallel alignment within a matrix of fused optical cladding material.
Figure 4B:
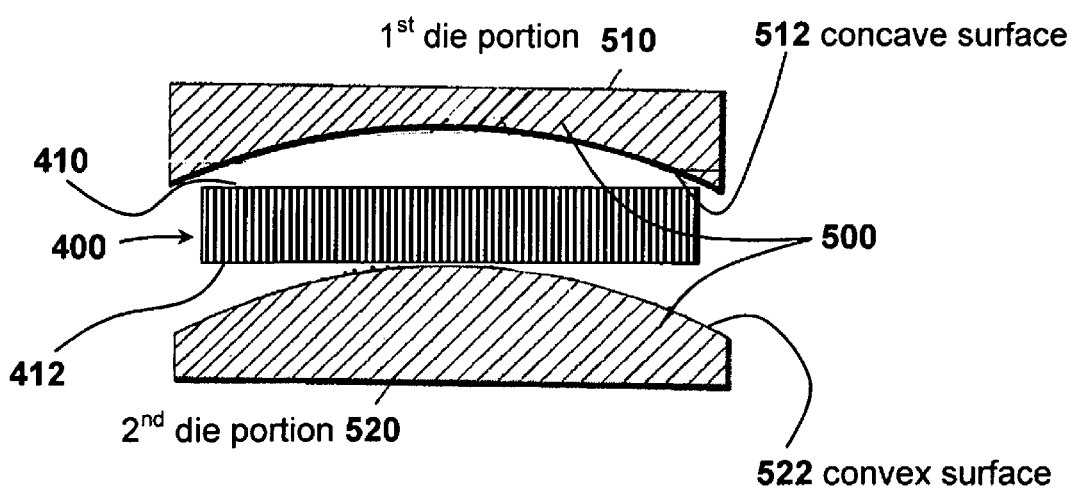
FIG. 4B schematically depicts the faceplate of FIG. 4A between the concave surface of a first die portion and the convex surface of a second die portion.
Figure 4C:
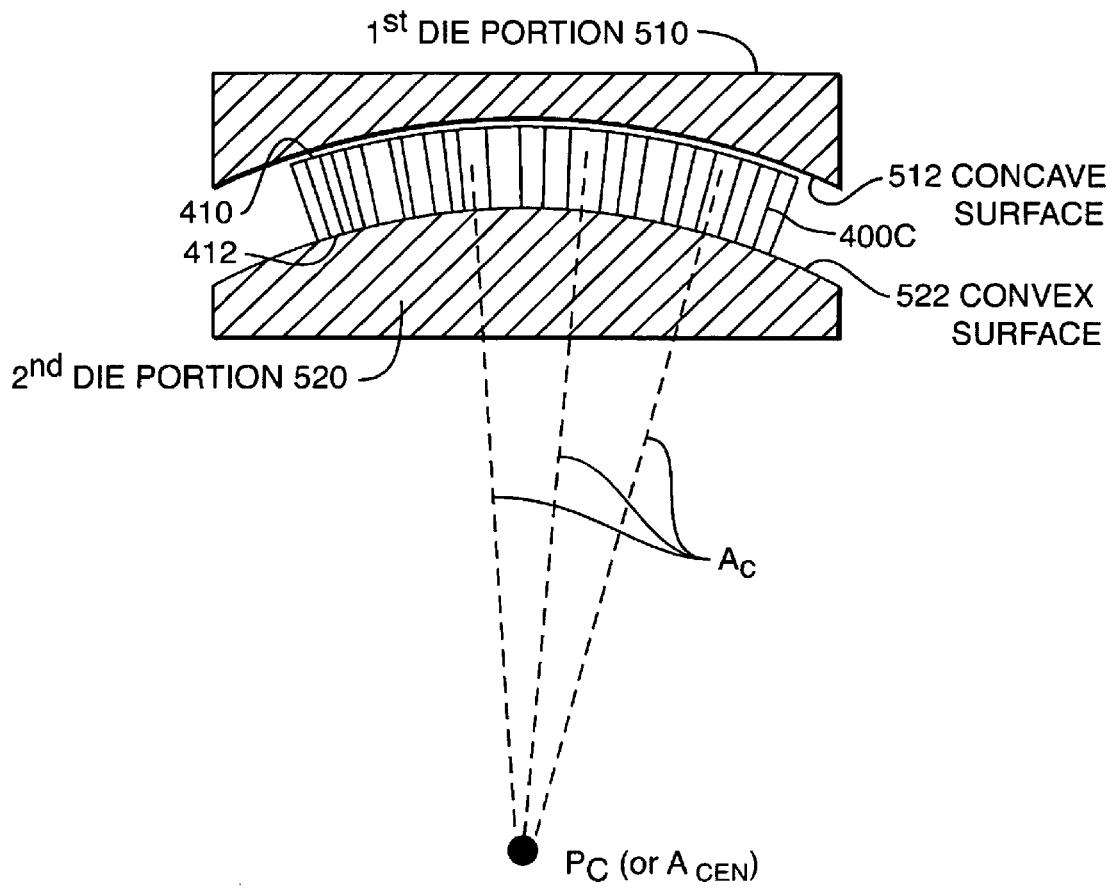
FIG. 4C shows the faceplate of FIGS. 4A and 4B reformed into a curved faceplate after heating and compression between the convex and concave surfaces of the first and second die portions.
Figure 4D:
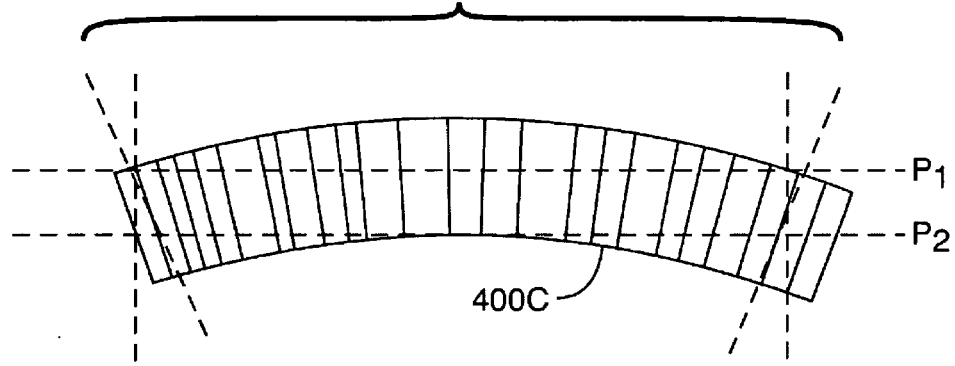
FIG. 4D shows the curved faceplate of FIG. 4C after removal from between the first and second die portions and also indicates planes along which the curved faceplate is to be cut.
Figure 4E:
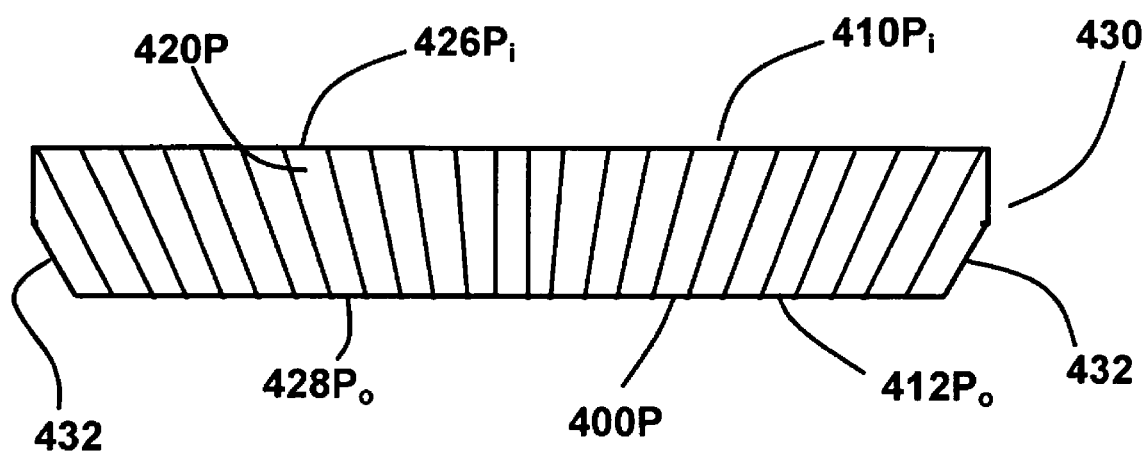
FIG. 4E shows the faceplate resulting from the cutting of the curved faceplate of FIGS. 4C and 4D after cutting along the cut planes indicated in FIG. 4D.

In conjunction with FIGS. 3 through 4E, an illustrative method of fabricating an image-reducing optical fiber faceplate such as the faceplates 150 of FIGS. 1 and 2 is now described. Referring to FIG. 3, a sequence of steps illustrates a method of fabricating an optical fiber faceplate having convergent imaging conduits. It should be noted that the sequence of steps presented in the drawing and the text to follow is illustrative only and not necessarily indicative of the order in which the steps must be performed. Accordingly, nothing in the drawings, this description or the corresponding claims should be construed so as to limit the scope of the invention to a particular sequence of steps in the absence of explicit statements to the contrary or unless a particular order is inextricably dictated by context (e.g., an instance in which it is impossible to perform a particular step prior to the performance of another step.). Moreover, while the reference numbering for the faceplates and the sub-elements thereof in connection with the illustrative fabrication method differs from the numbering convention used in association with the apparatus of FIGS. 1 and 2, it will be readily appreciated that the product 400P of the illustrative method is usable as a faceplate 150 as shown in FIGS. 1 and 2.

Referring now to FIGS. 3 and 4A, the illustrative method 300 presented in FIG. 3 includes a step 310 of providing an optical fiber faceplate 400 including opposed first and second faces 410 and 412 and a plurality of adjacently bonded light-conductive imaging conduits 420. The illustrative faceplate 400 of FIG. 4A is traditional in that the first and second faces 410 and 412 are planar and mutually parallel, but alternative implementations in which the initial faceplate 400 has at least one of (i) non-planar and (ii) non-parallel faces 410 and 412 are within the scope and contemplation of the invention. In the illustrative faceplate 400 shown in FIG. 4A and associated with step 310, each imaging conduit 420 includes an optically transmissive core 422 that has an imaging-core refractive index $n_{CORE}$. Each optically transmissive core 422 is surrounded by a cladding material 424 having an imaging-cladding refractive index $n_{CLAD}$ lower than the imaging-core refractive index $n_{CORE}$ such that light propagates through the imaging conduit 420 by internal reflection. The optical cores 422 of the initial faceplate 400 extend along mutually parallel core axes $A_C$ that extend though the first and second faces 410 and 412 of the faceplate 400.

At step 315, the faceplate 400 is positioned with at least one of the first and second faces 410 and 412 in contact with a form surface having a predetermined curvature. In FIG. 4B, a schematically depicted form 500 (or mold 500) includes a first die portion 510 exhibiting a convex surface 512 and a second die portion 520 exhibiting a concave surface 522. The faceplate 400 is situated between the concave surface 512 of the first die portion 510 and the concave surface 522 of the second die portion 520 such that one of the first face 410 faces the concave surface 512 and the second face 412 faces the convex surface 522.

In accordance with step 320, the faceplate 400 is heated to a temperature sufficient to cause the faceplate 400 to soften, and the at least one of the first and second faces 410 and 412 that is in contact with a curved form surface 512 or 522 is caused to conform to the curved surface 512 or 522 with which it is in contact. In the schematic representation of FIG. 4C, each of the first and second surfaces 410 and 412 is caused to conform to a curved surface. More specifically, the concave surface 512 of the first die portion 510 is urged into contacting engagement with the first face 410 of the faceplate 400 and the convex surface 522 of the second die portion 520 is urged into contacting engagement with the second face 412 of the faceplate 400 as the faceplate 400 is pressed between the concave and convex surfaces 512 and 522. FIG. 4C illustrates that as each of the first and second faces 410 and 412 conforms to, respectively, the concave surface 512 and convex surface 522 with which it is caused to come in contact, the core axes $A_C$ of at least a selected set of cores 422 within the faceplate 400 are angularly displaced from a mutually parallel alignment to a convergent alignment. Moreover, in various implementations, the first and second faces 410 and 412 assume curvatures that are mutually concentric about one of (a) a point and (b) an axis. In the version depicted in FIG. 4C, the faceplate 400 has been molded to form a curved faceplate 400C and the core axes $A_C$ are shown converging to a central point $P_C$ at the center of an imaginary sphere (not shown), in one instance, and, as a parenthetical alternative instance, to a central axis $A_{CEN}$ at the center of and imaginary cylinder (not shown).

Step 325 prescribes cooling of the curved faceplate 400C sufficiently to cause the faceplate 400C to become rigid (e.g., self supporting). At step 330, the curved faceplate 400C is cut along first and second planes $P_1$ and $P_2$, as shown in FIG. 4D, in order to form, as shown in FIG. 4E, an optical fiber faceplate 400P including a planar image-input face $410P_i$, a planar image-output face $412P_o$ opposite the image-input face $410P_i$, and a plurality of convergent imaging conduits 420P extending between the planar image-input and image-output faces $410P_i$ and $412P_o$. In a typical version, the planes $P_1$ and $P_2$ along which the cuts are made to form the opposed image-input and image-output faces $410P_i$ and $412P_o$ are parallel, as shown in FIG. 4E, but faceplates 400P having image-input and image-output faces $410P_i$ and $412P_o$ otherwise relatively oriented are within the scope and contemplation of the invention. The orientation of the imaging conduits 420P relative to the planar image-input and image-output faces $410P_i$ and $412P_o$ is such that light-input ends and light-output ends $426P_i$ and $428P_o$ of the imaging conduits 420P coincide with, respectively, the planar image-input face $410P_i$ and the planar image-output face $412P_o$ of the optical fiber faceplate 400P.

In addition to cutting the curved faceplate 400C along first and second planes $P_1$ and $P_2$, the optical fiber faceplate 400P is, in alternative versions, cut to form a periphery 430 including at least one beveled edge 432. As explained in conjunction with FIG. 2, the formation of beveled edges 432 facilitates, among other advantages, tight adjacent abutment of neighboring faceplates 400P and the routing of electrical conduits 180 such as bond wires between neighboring faceplates 400P. The beveled edges 432 are cut so that they taper downwardly toward the image-output face $412P_o$ of the optical fiber faceplate 400P. As shown in the examples of FIGS. 1 and 2, the image-input faces 152 of multiple faceplates 150 with "rearwardly tapered" peripheries 156 can be mutually abutted in tight formation to form a larger format image-input surface 152S of a tiled imaging array 100 with minimized delineations between faceplates 150, thereby effectuating the illusion of structural and, more importantly, input-image continuity.

The foregoing is considered to be illustrative of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention as expressed in the appended claims.

What is claimed is:

1. An imaging module comprising an optical fiber faceplate including an image-input face, an image-output face, and a plurality of adjacently fused imaging conduits extending between the image-input and image-output faces; wherein (i) each imaging conduit comprises an optically transmissive core with an imaging-core refractive index surrounded by a cladding material with an imaging-cladding refractive index lower than the imaging-core refractive index such that light propagates through the imaging conduit by internal reflection and (ii) the imaging conduits are oriented within the faceplate such that they extend along conduit axes that mutually converge in the direction from the image-input face to image-output face.

2. The imaging module of claim 1 further comprising an imaging detector array including a plurality of photosensitive detector elements arranged in accordance with a predetermined array format; wherein the faceplate is situated in front of the detector array such that light incident upon the image-input face is transmitted through the faceplate and optically communicated to the detector elements through the image-output face.

3. The imaging module of claim 2 wherein the faceplate includes a periphery that extends between the image-input and image-output faces and is defined by beveled edges that taper toward the image-output face.

4. The imaging module of claim 1 wherein the faceplate includes a periphery that extends between the image-input and image-output faces and is defined by beveled edges that taper toward the image-output face.

5. The imaging module of claim 1 wherein the conduit axes along which the imaging conduits of the faceplate extend converge toward a central point at the center of an imaginary sphere.

6. The imaging module of claim 5 further comprising an imaging detector array including a plurality of photosensitive detector elements arranged in accordance with a predetermined array format; wherein the faceplate is situated in front of the detector array such that light incident upon the image-input face is transmitted through the faceplate and optically communicated to the detector elements through the image-output face.

7. The imaging module of claim 6 wherein the faceplate includes a periphery that extends between the image-input and image-output faces and is defined by beveled edges that taper toward the image-output face.

8. The imaging module of claim 1 wherein the conduit axes along which the imaging conduits of the faceplate extend converge toward a central axes at the center of an imaginary cylinder.

9. The imaging module of claim 8 further comprising an imaging detector array including a plurality of photosensitive detector elements arranged in accordance with a predetermined array format; wherein the faceplate is situated in front of the detector array such that light incident upon the image-input face is transmitted through the faceplate and optically communicated to the detector elements through the image-output face.

10. The imaging module of claim 9 wherein the faceplate includes a periphery that extends between the image-input and image-output faces and is defined by beveled edges that taper toward the image-output face.

11. The imaging module of claim 1 wherein the optical fiber faceplate is fabricated in accordance with a method comprising:

providing an optical fiber faceplate including opposed and mutually parallel first and second faces and a plurality of adjacently bonded light-conductive imaging conduits, wherein (i) each imaging conduit includes an optically transmissive core having an imaging-core refractive index surrounded by a cladding material having an imaging-cladding refractive index lower than the imaging-core refractive index such that light propagates through the imaging conduit by total internal reflection and (ii) the optical cores extend along mutually parallel core axes that extend though the first and second faces;

positioning at least one of the first and second faces of the faceplate in contact with a form surface having a predetermined curvature;

heating the faceplate to a temperature sufficient to cause the faceplate to soften and cause the at least one of the first and second faces that is in contact with a curved form surface to conform to the curved surface with which it is in contact such that the core axes move from a mutually parallel alignment to a convergent alignment and the first and second faces of the faceplate assume curvatures;

cooling the curved faceplate sufficiently to cause the faceplate to become rigid; and cutting the curved faceplate along two parallel planes in order to form an optical fiber faceplate including a planar image-input face, a planar image-output face opposite the image-input face, and a plurality of convergent imaging conduits extending between the image-input and image-output faces.

12. A tiled imaging array comprising:

at least two imaging modules each of which imaging modules comprises an optical fiber faceplate including an image-input face, an image-output face, and a plurality of adjacently fused imaging conduits extending between the image-input and image-output faces; wherein (i) each imaging conduit comprises an optically transmissive core with an imaging-core refractive index surrounded by a cladding material with an imaging-cladding refractive index lower than the imaging-core refractive index such that light propagates through the imaging conduit by internal reflection;

(ii) the imaging conduits are oriented within each faceplate such that they extend along conduit axes that mutually converge in the direction from the image-input face to image-output face of the faceplate; and (iii) the image-input faces of at least two of the at least two imaging modules are mutually abutted in tight formation in order to define an image-input surface of the titled imaging array.

13. The tiled imaging array of claim 12 wherein (i) each imaging module further comprises an imaging detector array that is associated with the faceplate of that imaging module and includes a plurality of photosensitive detector elements arranged in accordance with a predetermined array format; and (ii) the faceplate of each imaging module is situated in front of the detector array with which the faceplate is associated such that light incident upon the image-input face is transmitted through the faceplate and optically communicated to the detector elements through the image-output face.

14. The tiled imaging array of claim 13 wherein (i) each faceplate of at least two of the at least two imaging modules includes a periphery that extends between the image-input and image-output faces and is defined by at least one beveled edge; and (ii) at least two faceplates including beveled edges are mutually abutted such that the beveled edges combine to define a V-shaped channel rearward of the image-input surface of the tiled imaging array.

15. The tiled imaging array of claim 14 wherein at least one of the optical fiber faceplates is fabricated in accordance with a method comprising:

providing an optical fiber faceplate including opposed and mutually parallel first and second faces and a plurality of adjacently bonded light-conductive imaging conduits, wherein (i) each imaging conduit includes an optically transmissive core having an imaging-core refractive index surrounded by a cladding material having an imaging-cladding refractive index lower than the imaging-core refractive index such that light propagates through the imaging conduit by total internal reflection and (ii) the optical cores extend along mutually parallel core axes that extend though the first and second faces;

positioning at least one of the first and second faces of the faceplate in contact with a form surface having a predetermined curvature;

heating the faceplate to a temperature sufficient to cause the faceplate to soften and cause the at least one of the first and second faces that is in contact with a curved form surface to conform to the curved surface with which it is in contact such that the core axes move from a mutually parallel alignment to a convergent alignment and the first and second faces of the faceplate assume curvatures;

cooling the curved faceplate sufficiently to cause the faceplate to become rigid; and cutting the curved faceplate along two parallel planes in order to form an optical fiber faceplate including a planar image-input face, a planar image-output face opposite the image-input face, and a plurality of convergent imaging conduits extending between the image-input and image-output faces.

16. The tiled imaging array of claim 12 wherein at least one of the optical fiber faceplates is fabricated in accordance with a method comprising:

providing an optical fiber faceplate including opposed and mutually parallel first and second faces and a plurality of adjacently bonded light-conductive imaging conduits, wherein (i) each imaging conduit includes an optically transmissive core having an imaging-core refractive index surrounded by a cladding material having an imaging-cladding refractive index lower than the imaging-core refractive index such that light propagates through the imaging conduit by total internal reflection and (ii) the optical cores extend along mutually parallel core axes that extend though the first and second faces;

positioning at least one of the first and second faces of the faceplate in contact with a form surface having a predetermined curvature;

heating the faceplate to a temperature sufficient to cause the faceplate to soften and cause the at least one of the first and second faces that is in contact with a curved form surface to conform to the curved surface with which it is in contact such that the core axes move from a mutually parallel alignment to a convergent alignment and the first and second faces of the faceplate assume curvatures;

cooling the curved faceplate sufficiently to cause the faceplate to become rigid; and cutting the curved faceplate along two parallel planes in order to form an optical fiber faceplate including a planar image-input face, a planar image-output face opposite the image-input face, and a plurality of convergent imaging conduits extending between the image-input and image-output faces.

17. An imaging module comprising:

an imaging detector array including a plurality of photosensitive detector elements arranged in accordance with a predetermined array format; and an image-reducing optical fiber faceplate situated in front of the detector array and including an image-input face, a planar image-output face, and a plurality of adjacently fused, internally reflecting imaging conduits extending between the image-input and image-output faces along conduit axes that mutually converge such that an image inputted through the image-input face is reduced in size along at least one dimension and optically communicated to the detector array through the image-output face.

18. The imaging module of claim 17 wherein the image-reducing optical fiber faceplate is fabricated in accordance with a method comprising:

providing an optical fiber faceplate including opposed and mutually parallel first and second faces and a plurality of adjacently bonded light-conductive imaging conduits, wherein (i) each imaging conduit includes an optically transmissive core having an imaging-core refractive index surrounded by a cladding material having an imaging-cladding refractive index lower than the imaging-core refractive index such that light propagates through the imaging conduit by total internal reflection and (ii) the optical cores extend along mutually parallel core axes that extend though the first and second faces;

positioning at least one of the first and second faces of the faceplate in contact with a form surface having a predetermined curvature;

heating the faceplate to a temperature sufficient to cause the faceplate to soften and cause the at least one of the first and second faces that is in contact with a curved form surface to conform to the curved surface with which it is in contact such that the core axes move from a mutually parallel alignment to a convergent alignment and the first and second faces of the faceplate assume curvatures;

cooling the curved faceplate sufficiently to cause the faceplate to become rigid; and cutting the curved faceplate along two parallel planes in order to form an optical fiber faceplate including a planar image-input face, a planar image-output face opposite the image-input face, and a plurality of convergent imaging conduits extending between the image-input and image-output faces.

* * * * *